(12) United States Patent
Neubauer et al.

(10) Patent No.: US 8,128,743 B2
(45) Date of Patent: Mar. 6, 2012

(54) GAS SCRUBBER WITH ADAPTED DROP SEPARATORS

(75) Inventors: Georg Neubauer, Ot Seeburg (DE);
Andre Voss, Neuruppin (DE);
Lambertus Huisken, Ratingen (DE);
Qiang Xu, Starnberg (DE)

(73) Assignee: Rea Plastik Tech GmbH, Neuruppin (DE)

( * ) Notice: Subject to any disclaimer, the term of this patent is extended or adjusted under 35 U.S.C. 154(b) by 238 days.

(21) Appl. No.: 12/061,278

(22) Filed: Apr. 2, 2008

(65) Prior Publication Data
US 2008/0264263 A1 Oct. 30, 2008

Related U.S. Application Data

(63) Continuation of application No. PCT/EP2006/011279, filed on Nov. 24, 2006.

(30) Foreign Application Priority Data

Nov. 28, 2005 (DE) .................. 10 2005 056 543

(51) Int. Cl.
*B01D 47/00* (2006.01)
(52) U.S. Cl. .................. 96/300; 96/356; 55/440
(58) Field of Classification Search .............. 96/290, 96/188, 189, 190, 192, 197, 198, 356, 357; 96/360, 300, 358; 55/422, 440; 95/216, 95/221; 262/108, 109, 110, 111, 113, 114.1, 262/115; 211/108, 109, 110, 111, 113, 114.1, 211/115
See application file for complete search history.

(56) References Cited

U.S. PATENT DOCUMENTS

| | | | | |
|---|---|---|---|---|
| 3,226,098 A | * | 12/1965 | Shryock | 261/24 |
| 3,748,832 A | * | 7/1973 | Furlong et al. | 96/356 |
| 3,757,498 A | * | 9/1973 | Hurlbut et al. | 55/440 |
| 3,811,252 A | * | 5/1974 | Evans et al. | 96/237 |
| B430,106 I5 | | 1/1975 | Fallon, III | |
| 3,870,487 A | | 3/1975 | Hurlbut, Sr. et al. | |
| 3,880,624 A | * | 4/1975 | Arnold et al. | 96/228 |
| 3,917,764 A | * | 11/1975 | Phelps | 261/111 |
| 3,933,450 A | * | 1/1976 | Percevaut | 96/319 |
| 4,045,193 A | * | 8/1977 | Halliday | 96/356 |
| 4,129,626 A | * | 12/1978 | Mellbom | 261/114.3 |
| 4,145,195 A | * | 3/1979 | Knappstein et al. | 96/232 |
| 4,157,250 A | * | 6/1979 | Regehr et al. | 96/299 |
| 4,383,500 A | * | 5/1983 | Lavalerie et al. | 122/491 |
| 4,553,993 A | * | 11/1985 | Wigley | 55/440 |
| 4,784,674 A | * | 11/1988 | Sarmiento et al. | 95/272 |
| 5,019,300 A | * | 5/1991 | Davis et al. | 261/23.1 |

(Continued)

FOREIGN PATENT DOCUMENTS

| | | |
|---|---|---|
| DE | 2725119 B1 | 10/1978 |
| DE | 3434133 C1 | 1/1986 |
| DE | 19521178 A1 | 12/1996 |
| DE | 19501282 C2 | 7/1998 |

(Continued)

*Primary Examiner* — Duane Smith
*Assistant Examiner* — Thomas McKenzie
(74) *Attorney, Agent, or Firm* — BainwoodHuang

(57) ABSTRACT

Gas scrubber, with at least one drop separator level which spans a cross section of the gas scrubber, the gas scrubber comprising at least one edge rest and a plurality of carrying beams, spanning the cross section, for the mounting of drop separators which jointly delimit a free flow cross section of the gas scrubber, at least 95% of the free flow cross section being designed with throughflow drop separators. This is achieved preferably in that drop separators are used having a plurality of drop separator lamellae which are arranged at an inclination to one another and are fixed by means of at least two end plates of unequal level or non-parallel.

13 Claims, 3 Drawing Sheets

U.S. PATENT DOCUMENTS

| | | | |
|---|---|---|---|
| 5,320,651 A * | 6/1994 | Drummond | 96/356 |
| 5,662,721 A * | 9/1997 | Bresowar | 96/356 |
| 6,083,302 A * | 7/2000 | Bauver et al. | 95/216 |
| 6,293,527 B1 | 9/2001 | Ovard | |
| 7,137,622 B2 * | 11/2006 | Buchanan | 261/114.1 |
| 2002/0190403 A1 * | 12/2002 | Nutter et al. | 261/114.1 |
| 2005/0028498 A1 * | 2/2005 | Entezarian et al. | 55/320 |
| 2007/0137482 A1 * | 6/2007 | Xu et al. | 95/198 |
| 2008/0257162 A1 * | 10/2008 | Neubauer et al. | 96/296 |
| 2009/0071337 A1 * | 3/2009 | Nieuwoudt | 95/272 |

FOREIGN PATENT DOCUMENTS

| | | |
|---|---|---|
| DE | 19937083 C1 | 2/2001 |
| DE | 202005002674 U1 | 5/2005 |
| EP | 0489575 A1 | 6/1992 |
| EP | 0747107 A2 | 12/1996 |
| EP | 0864345 A1 | 9/1998 |
| WO | WO 95/033552 | 12/1995 |
| WO | WO 2004/033071 | 4/2004 |
| WO | WO 2005/107921 A1 | 11/2005 |

* cited by examiner

GAS SCRUBBER WITH ADAPTED DROP SEPARATORS

CROSS REFERENCE TO RELATED APPLICATIONS

This patent application is a Continuation of PCT application PCT/EP2006/011279 filed Nov. 24, 2006 and entitled "Gas Washer Provided With An Adapted Drop Separator", the contents and teachings of which are hereby incorporated by reference in their entirety.

BACKGROUND

The present invention relates to a gas scrubber, as it is known, which comprises at least one drop separator level through which a gas stream flows vertically, drop separators being installed in an, in particular, roof-shaped set-up. The invention is employed particularly preferably in the sector of flue-gas desulphurization.

The combustion of coal gives rise, inter alia, to sulphur dioxide gas which is a substantial cause of the death of forests. There are various methods for extracting the harmful sulphur dioxide from the flue gas. The wet method, as it is known, is used most often. In this, the unpurified flue gas is sprayed in a washing tower, also called an absorber tower or gas scrubber, with a mixture of water and limestone, what is known as a washing suspension, with the result that the sulphur dioxide is largely absorbed due to chemical reactions. It is thus possible to achieve a degree of desulphurization of more than 90%. In this case, the gaseous sulphur dioxide first dissolves in the washing liquid. Subsequently, due to the reaction of sulphur dioxide and limestone, calcium sulphite and carbon dioxide are obtained. The washing suspension laden with calcium sulphite collects in the lower part of the washing tower, in the absorber sump. By air being injected (oxidation), the liquid is enriched with oxygen, and a gypsum suspension occurs. After the water has been extracted, gypsum with a residual moisture of up to 10% is obtained in pourable form and is available as a useful product for delivery to the building materials industry.

The drop separators, as a rule, are installed downstream of the gas scrubbing in the gas flow direction and cover the entire cross section of the usually round gas scrubber tower. The drop separator is in this case formed by curved lamellae which lie parallel to and at a defined distance from one another and on which the drops contained in the gas flow are precipitated. The precipitated drops form a liquid film which, obeying the law of gravity, flows off downwards or falls in large drops downwards counter to the gas stream.

Since flue gas is heavily laden with fly ash and gypsum is formed during the further desulphurization process, there is always the risk that these solid particles are deposited on the drop separator and may even block this. Consequently, below the respective separator layer and often also above it (downstream of the drop separator in the gas flow direction), scavenging devices are installed, which periodically wash the drop separator lamellae and eliminate possible deposits. This scavenging device consists, inter alia, of pipes with nozzles inserted in them.

Drop separators set up in a roof-shaped manner, that is to say configurations with a V-shaped arrangement of inclined lamellae, have proved (particularly in the case of vertical gas stream) to be advantageous (for example, as compared with flat drop separators lying horizontally) both as regards cleaning off and keeping clean and in terms of a reliable separation performance. The drop separator lamellae of streamlined shape deflect the gas stream laden with liquid. The drops cannot perform this deflection because of their inertia, but, instead, impinge onto the drop separator lamellae (rebound-surface separator). In this case, a liquid film is obtained, which then for a large part flows off downwards along a suitable profile. In order to adapt the performance to the said object, the drop separators are offered with special shapes and properties. Consequently, the reliable removal of the liquid is ensured, while at the same time there is a high separation performance. Conventional forms of construction of these drop separators with inclined drop separator lamellae are known, for example, from DE 195 01 282 or DE 195 21 178. The roof-shaped drop separator is meanwhile being used by many power stations on account of these advantages.

A critical advantage of the roof-shaped drop separator is the reliable separation performance at high vertical gas velocities of more than 5 m/s, up to inflow gas velocities of 6.5 to 7.5 m/s, depending on the configuration. Conventional flat (horizontally lying) drop separators have their performance limit at 5.2 to 5.5 m/s (vertical inflow gas stream). The higher performance limit of roof-shaped drop separators is advantageous particularly in the operation of large plants for large-scale power stations. On account of the non-uniform gas flow in the gas scrubber, operational conditions and the structural configuration give rise in these gas scrubbers, which have, for example, a diameter of 12 m to 17 m and are operated under full load at a basic velocity of 3.5 m/s to 3.8 m/s, to local velocity peaks of 5 m/s to 6 m/s and, in individual instances, even more than this. Such velocity peaks lead, in conventional flat drop separators, to local failure and therefore considerable supercritical drop overflow. The performance of the overall drop separator is thereby reduced considerably, and contamination of the following plants in the flue-gas duct occurs.

As a result of these developments, the performance requirements have once more increased markedly. More modern plants are operated at higher basic velocities, for example of between 4.0 m/s and 4.5 m/s. Furthermore, markedly higher fluctuations of the basic velocity may occur locally. Even local velocity peaks of up to 10 m/s have been observed in individual instances.

The evaluation of these velocities must take into account the fact that the inflow velocity of the drop separator is, in turn, 15% to 25% higher than the basic velocity in the plant. In the region of the drop separator, the open gas-through flow cross-sectional area narrows due to carrying beams (on which the drop separator lies), because of the structural configuration of the drop separators and on account of the blinding of individual regions. This leads to a further rise in the basic velocity and to an even higher inflow velocity for the drop separator. An inflow velocity means that velocity of the gas stream which prevails or acts in the region of the drop separator. Basic velocities of 4.0 m/s to 4.5 m/s become an inflow velocity of 5.0 to 5.5 m/s. Correspondingly, velocity peaks of 6-8 m/s become inflow velocity peaks of 7.5 to 10 m/s, in individual instances up to 12 m/s. These velocities overtax even the currently conventional roof-shaped drop separators.

At the same time, the frequent problems with contaminations in the heat exchanger following drop separators have made power stations more sensitive with regard to the performance problems of the drop separator. The requirements as to pressure loss, the duration of an operating cycle and the characteristic value "residual content of drops in the flue gas" downstream of the drop separator have markedly intensified. Where, 10 years ago, residual contents of 100 to 150 mg/m³ were still required, nowadays 30 to 50 mg/m³ are mostly required as a guaranteed value for the residual content. The conventional roof-shaped drop separator meanwhile comes up against its performance limits under these conditions.

Both trends, to be precise the higher basic velocity with the higher velocity peaks, on the one hand, and the intensified requirements as to separation performance, on the other hand, point to the need to develop further the gas scrubbers and drop separators known hitherto.

In the known gas scrubbers, the individual drop separator levels are implemented in that a carrying structure comprising carrying beams and/or side rings is provided, on which a plurality of drop separator modules are positioned. As a rule, the modules are exchangeable and have a square or rectangular cross section. These modules, in so far as they have fitted into the spaces between the carrying beams or between the carrying beams and a side ring of the gas scrubber, have been installed, for example, in order to keep the costs of such a gas scrubber low. The still free flow cross sections have subsequently been closed (blinded) by means of plates or the like, so that the overall gas flow has been forced through the drop separators. In gas scrubbers of this type, however, insufficient purification or final humidification of the gas stream has been noted.

SUMMARY

Proceeding from this, the object of the present invention is to specify a gas scrubber which at least partially solves the technical problems outlined with regard to the prior art. In particular, an efficient gas scrubber is to be specified which is distinguished by a high separator performance. Furthermore, a drop separator is to be specified, by means of which a more efficient separation of impurities in a gas stream by means of a gas scrubber can be implemented. These objects are achieved by means of a gas scrubber as described and claimed herein. Further advantageous refinements of the gas scrubber and of the drop separator are specified respectively in the dependently formulated patent claims. It may be pointed out that the features listed individually in the patent claims may be combined with one another in any desired technologically expedient way and indicate further refinements of the invention.

The gas scrubber comprises at least one drop separator level which spans a cross section of the gas scrubber. Moreover, the gas scrubber has at least one edge rest and a plurality of carrying beams, spanning the cross section, for the mounting of drop separators. The edge rest and carrying beams jointly delimit a free flow cross section of the gas scrubber. According to the invention, then, it is proposed that at least 95% of the free flow cross section is designed with throughflow drop separators. Particularly preferably, at least 98% of the free flow cross section is designed with throughflow drop separators.

The free flow cross section is that part of the cross section of the gas scrubber in a drop separator level which is not covered by an edge rest, carrying beams and similar equipment for carrying the drop separators or a cleaning system. In other words, the free flow cross section constitutes that part of the cross section of a gas scrubber which remains after the fractions of area for the carrying structure have been subtracted. Usually, 10 to 14% of the cross section is required for the carrying structure (carrying beams and edge rest). This results normally in a free flow cross section which amounts to 86% or even 90% of the cross section of the gas scrubber. That is to say, for example, in a gas scrubber requiring 14% of its cross section for the carrying structure and in which an arrangement according to the invention of the drop separators is present in at least 99% of the free flow cross section, 85.14% of the overall cross section of the gas scrubber is in actual fact utilized effectively. Particularly preferably, the carrying structure is also configured such that certainly at least 90% of the overall cross section of the gas scrubber is designed with drop separators.

It is therefore proposed, accordingly, that virtually the entire cross section of the gas scrubber is utilized for separating the drops by means of drop separators provided. In this case, the positioning of drop separators in the free flow cross section means, in particular, that (essentially only) the drop separator lamellae are arranged there. Very particularly preferably, in actual fact, only the drop separator lamellae (and, if necessary, a cleaning system or spraying system) are arranged in this free flow cross section, so that all plant parts otherwise required (suspension systems, covers, pathways, fastenings, etc.) are arranged in the remaining cross section uncritically in flow terms. In contrast to the prior art, in which, where appropriate, a further drop separator level has been used, the invention goes towards utilizing the individual drop separator level as effectively as possible. This also has advantages in as much as extreme rises in gas velocities can be avoided on account of the slight reduction in the free flow cross section by blinding, an unfavorable construction of the drop separators or the like. Moreover, the result of a reduction in the gas velocity by such measures is that the drop separators themselves can operate with higher effectiveness. This leads, overall, to a surprisingly good result. In this case, under certain circumstances, with an additional utilization of a drop separator level of approximately 10%, an entire additional drop separator level may be saved. Furthermore, the performance of the drop separator can thus be markedly increased, and, consequently, operating problems in the following plants of the flue-gas path can be avoided.

According to an advantageous development of the gas scrubber, the latter has a cross section with an at least partially bent circumference, drop separators adapted to the at least partially bent circumference being provided. That is to say, for example, the side parts of a drop separator have a configuration such that they can be positioned nearer to this bent circumference, as compared with the known square or rectangular modules. For this purpose, if necessary, the side regions may also be partially bent, although slopes or steps are preferred. In this case, account must be taken of the fact that the circumference or cross section of such a gas scrubber varies in part considerably during operation, this being connected with the changing thermal conditions inside the gas scrubber. To that extent, there is no need for a particularly exact adaptation to the circumference, so that, if appropriate, a compression or deformation of the gas scrubber can also be compensated. This not precisely foreseeable variation in the external configuration of the gas scrubber was a further reason why a utilization according to the invention of the cross section, as proposed here according to the invention, has hitherto been avoided.

Furthermore, it is also proposed that the drop separators be held by means of a supporting structure which is arranged essentially in the flow shadow of the edge rest and of the plurality of carrying beams. As is known, the drop separators comprise a plurality of drop separator lamellae which are arranged essentially parallel to one another and are held in a supporting structure which is arranged in each case laterally in the region of the ends of the drop separator lamellae. These supporting structures also serve for fastening to the edge rest and/or the carrying beams. Whereas, for example in known drop separator modules, a partial surrounding of the edge rest or the carrying beams by the supporting structure is provided, here a drop separator is preferred, the supporting structure of which is arranged in the flow shadow of the edge rest or of the carrying beams. A further reduction in the free flow cross section on account of the supporting structure of the drop separators themselves is consequently avoided.

According to yet a further refinement of the gas scrubber, a supporting structure for mounting the drop separators is likewise provided, the supporting structure lying at least on the edge rest or the plurality of carrying beams. A configuration is preferred, in which the supporting structure lies both on the edge rest and on the carrying beams. This means, in particular, that a locally fixed securing of the drop separators with respect to the gas scrubber or the edge rest and/or the carrying beams is relinquished. Instead, that the drop separators are laid in place allows some relative movement of the drop separators with respect to the gas scrubber or the carrying structure. This is advantageous particularly in such an efficient utilization of the cross section of the gas scrubber with drop separators, so that the gas scrubber cross section changing during the operation of the gas scrubber can be compensated. If, for example, the wall of the gas scrubber contracts somewhat in one direction, so that a round cross section becomes a more elliptic cross section, the drop separators may slip back and forth to some extent on the carrying structure. In this case, it is clear that, if appropriate, securing means must be provided for this, which limit such a relative movement of the drop separators in relation to the edge rest and/or the carrying beams. In the known drop separators which are suspended in the areas between the carrying beams or between the carrying beams and the side rest, neither relative movement nor the simple adaptation to varying scrubber outer wall shapes is possible.

According to a further aspect of the invention, a drop separator for a gas scrubber is proposed which has a plurality of drop separator lamellae which are arranged at an inclination to one another and are fixed by means of at least two end plates, the end plates being at least of unequal level or non-parallel with respect to one another. Preferably, the end plates are of unequal level and non-parallel with respect to one another. What is meant by "of unequal level" is, in particular, that the end plates are arranged at a different height level or the fixing of the ends of the drop separator lamellae is carried out at a different height level. What is meant by "non-parallel" is, in particular, that the end plates are at least partially inclined, arranged obliquely, tilted or the like with respect to one another. The configuration of the drop separator is preferred in which one end plate is oriented essentially perpendicularly with respect to two adjacent flanks of a drop separator and an opposite end plate is oriented at least a non-perpendicular angle to these flanks.

To explain the arrangement of the drop separator lamellae, it may be pointed out that the term "drop separator lamellae arranged at an inclination to one another" means, in particular, a V-shaped, a roof-shaped, a combined V-roof-shaped and similar arrangements of drop separator lamellae. That is to say, also, in other words, drop separators are meant here, in particular, which have no exclusively plane arrangement of drop separator lamellae. Here, for the first time, in such a complicated construction of a drop separator, a modular type of construction is disregarded. A drop separator adapted in this way may be employed, in particular, in conjunction with the gas scrubber mentioned above and described according to the invention. The drop separator with the inclined construction in respect of the drop separator lamellae has a very high separation performance, so that the effectiveness of such a gas scrubber can be further increased in this way.

Precisely where such a construction of the drop separator lamellae is concerned, a relatively complex supporting structure is required, which is in this case also provided by means of an, if appropriate, non-symmetrical or non-regular construction. This makes it possible to integrate such drop separators, so that a corresponding drop separator level can be better adapted to the outer shape or the circumference of the gas scrubber. Even if this results in a considerable extra outlay in terms of production costs and logistics in positioning such drop separators in the gas scrubber, the improvements achieved thereby, precisely in terms of the avoidance of problems resulting from local extremely high flow velocities, are overwhelming.

As a result of a development of the drop separator, the plurality of drop separator lamellae are designed at least partially with a different length. In this case, advantageously, all the drop separator lamellae fastened to an end plate have the same inclination. That is to say, in other words, for example, opposite pairings of drop separator lamellae have an inclination of the same amount with respect to the drop separator level, but are in this case of different length.

Precisely in connection with the gas scrubbers described in the introduction, it is advantageous that the drop separator is designed with at least one outwardly directed sliding foot. What is meant by "outwardly" is, in particular, that the sliding foot points away from the drop separator lamellae. What is meant by "sliding foot" is, in particular, a supporting structure by means of which the drop separator can be laid onto the carrying structure consisting of carrying beams and/or edge rest. Preferably, a sliding foot is provided only in the case of contact with the edge rest, whereas, as regards the carrying beams, a firm (but advantageously releasable) connection is also provided. In this case, this sliding foot makes it possible, for example when an external force acts on the drop separator, to have a relative movement or sliding movement with respect to the carrying structure of the gas scrubber. The sliding foot preferably comprises supporting struts and a bearing surface.

Furthermore, it has proved advantageous that the plurality of drop separator lamellae of a drop separator are welded to the end plates. For this purpose, the drop separator lamellae are preferably at least partially inserted individually through a corresponding clearance of the end plates and are subsequently welded to one another in the region of contact of the drop separator lamellae and the clearance. This ensures a secure fixing of the drop separator lamellae with respect to the end plates and a sealing limit in terms of the gas stream or liquid stream flowing past internally.

Finally, it is also proposed that a height compensation means for implementing a specific inclination of the drop separator lamellae be provided. This means preferably that, for example, sliding feet of the drop separator which are of different height are provided. This serves particularly for the design of end plates of unequal level. This is precisely the case on the edge rest, because, there, because of being adapted to the rounding of the gas scrubber, the drop separator lamellae are of different length and therefore end at different heights.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
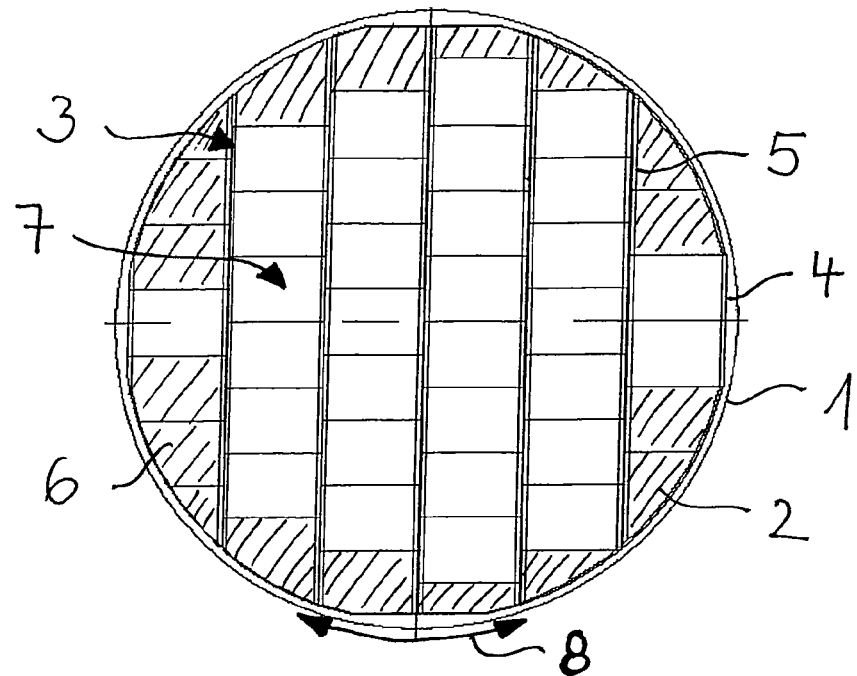
FIG. 1 shows a first design variant of a gas scrubber with adapted drop separator modules.

FIG. 1 shows diagrammatically a gas scrubber 1 with a drop separator level 2 which spans a cross section 3 of the gas scrubber 1. The gas scrubber 1 has an annular edge rest 4 and a plurality of carrying beams 5, spanning the cross section 3, for the mounting of drop separators 6, here the carrying beams 5 having essentially the same orientation and being oriented parallel to one another. The distance between the carrying beams 5 is selected such that, for example, the drop separator modules, illustrated without hatching, can be mounted or attached on them.

The entire virtually circular cross section 3 of the gas scrubber 1 is therefore not available completely for a throughflow of gas. Instead, the edge rest 4 and the carrying beams 5 form a flow shadow or flow resistance which amounts, for example, to 10 to 13% of the cross section 3 of a gas scrubber 1. According to the invention, then, at least 95% of the free flow cross section 7 is designed with throughflow drop separators 6. Under certain circumstances, for example, even a utilization of at least 90% of the free flow cross section 7 by correspondingly adapted throughflow drop separators 6 may have an appreciable effect in terms of the effectiveness of the gas scrubber 1.

As illustrated in FIG. 1, for this purpose, drop separators 6 are provided which are adapted particularly to the bent circumference 8 of the gas scrubber 1 and which have been emphasized here by hatching. The hatched area also symbolizes approximately the region which would have been blinded by plates in conventional plants in order to prevent a flow of unpurified gases through the drop separator level 2. There has been a move away from this by the use of correspondingly adapted drop separators 6, so that, particularly in terms of the flow velocities occurring in the gas stream to be purified, extreme velocity peaks are now avoided.

Figure 2:
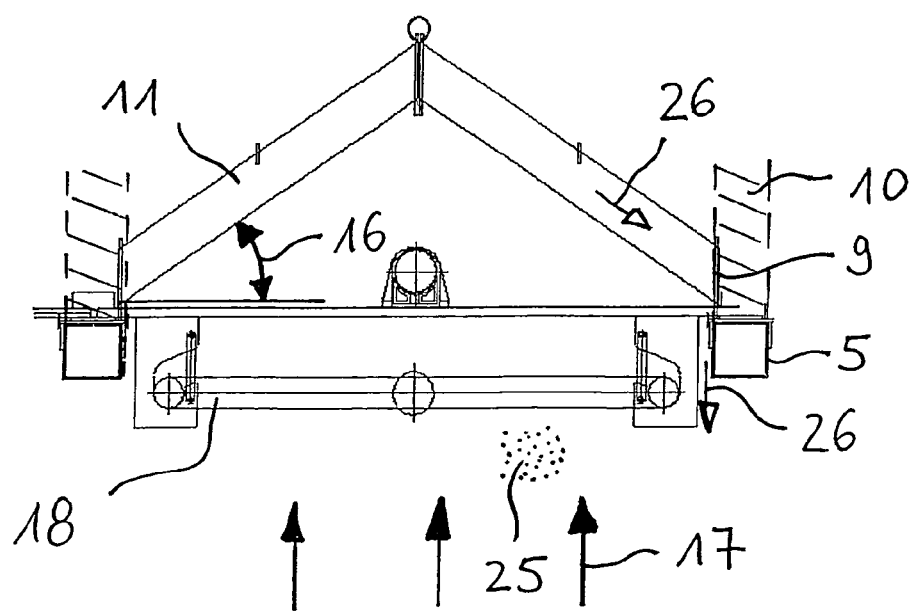
FIG. 2 shows a design variant of a drop separator module, such as may be used, for example, in the central region of the gas scrubber illustrated in FIG. 1.

FIG. 2 illustrates diagrammatically a drop separator module, such as could be arranged, for example, in the central region of the gas scrubber 1 illustrated in FIG. 1. The drop separator 6 is mounted on two carrying beams 5, the supporting structures 9 of the drop separator lamellae 11 being arranged in the flow shadow 10 of these carrying beams 5. Two sets, each having a plurality of drop separator lamellae 11, are held via the supporting structure 9 and are positioned with an inclination 16 to the horizontal. The two sets are connected to one another or held centrally. To clean such a drop separator 6, a spraying system 18 is additionally provided, with the aid of which it is possible to wash off the drop separator lamellae 11. To purify a gas stream of deposits or to remove moisture 25 contained in it, the gas stream is routed through between the carrying beams 5 in the flow direction 17 and brought into contact with the drop separator lamellae 11. The drop separator lamellae 11 of streamlined shape deflect the gas stream and the moisture 25 contained in it, but the particles (water, deposits, etc.) contained in the gas stream cannot follow such deflection because of their inertia. These drops impinge onto the drop separator lamellae, a liquid stream then occurring on these drop separator lamellae 11 in the flow direction 26 towards the supporting structure 9. This liquid stream is led further downwards in the flow shadow 10 of the carrying beams 5.

Figure 3:
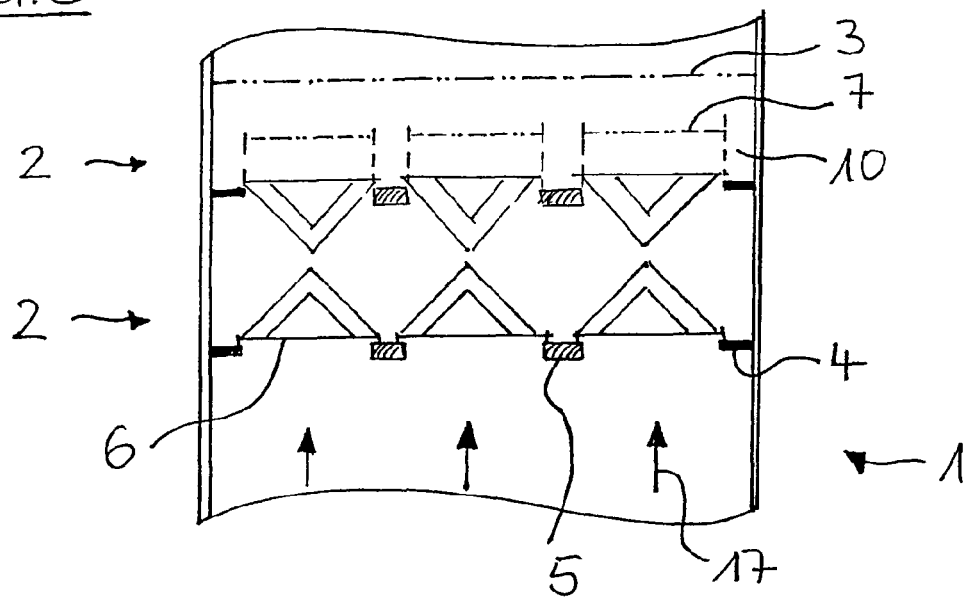
FIG. 3 shows a cross section through a further design variant of a gas scrubber according to the invention.

FIG. 3 illustrates diagrammatically a detail of a gas scrubber 1. Illustrated here are, in particular, the cross section 3 of the gas scrubber 1 and the flow shadow 10 which is formed by the carrying beams 5 and the edge rest 4 and which therefore defines a free flow cross section 7. According to the invention, the drop separators 6 are arranged in a drop separator level 2 such that the whole of the free flow cross sections 7 of at least 90% of the free flow cross section is designed with throughflow drop separators 6.

As may also be gathered from FIG. 3, the drop separators 6, which here have a V-shaped or roof-shaped design, may be positioned, oriented opposite to one another, in different drop separator levels 2. This is not absolutely necessary, however, so that, for example, a co-directional orientation may also be expedient. Combined V-shaped and roof-shaped drop separators 6 may likewise be implemented in a drop separator level 2.

Figure 4:
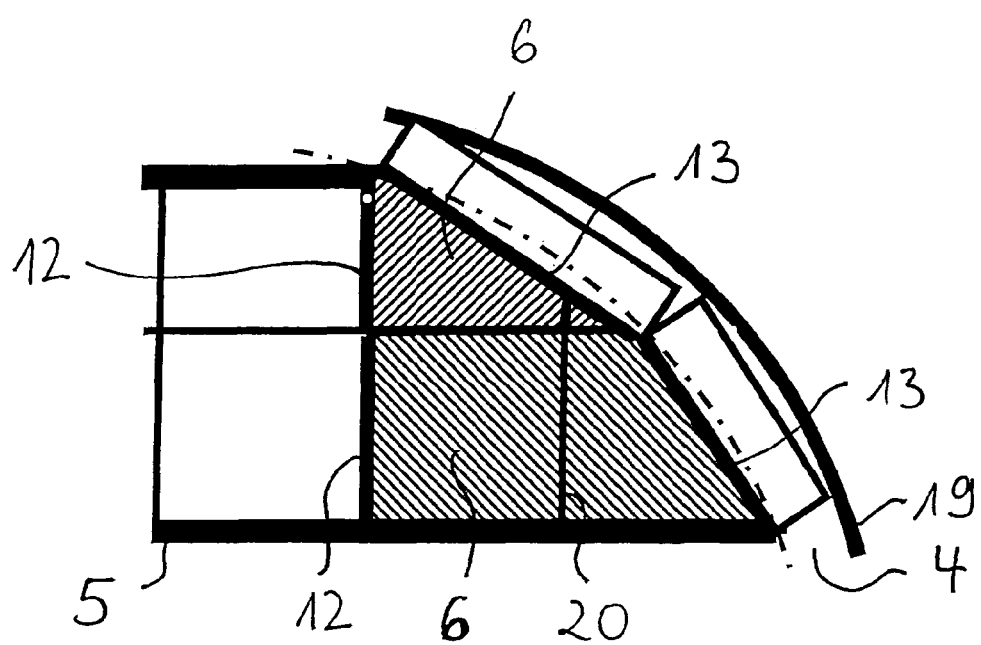
FIG. 4 shows a detail of a gas scrubber of a further design variant in the region of an edge rest.

FIG. 4 illustrates, then, in a view of a detail, the provision of adapted drop separators 6 in relation to a virtually round wall 19 of the gas scrubber 1. The wall 19 is designed, in turn, with an edge rest 4 running around essentially annularly. Moreover, a plurality of carrying beams 5 extend into inner regions of the gas scrubber 1. A plurality of drop separators 6 are positioned on these carrying beams 5. The drop separators 6 are again of V-shaped design, so that the face 20 at which the two sets having the inclined drop separator lamellae 11 are connected to one another can be seen here. The two differently hatched part-regions illustrate in each case a V-shaped or roof-shaped drop separator 6. The two drop separators 6 have two end plates 12, 13, these being non-parallel with respect to one another. Whereas the first end plate 12 is at an essentially right angle (90°) to the flanks of the drop separator, the second end plate 13 is in each case arranged obliquely thereto. Drop separator modules 6 can consequently be positioned nearer to the wall 19.

Figure 5:
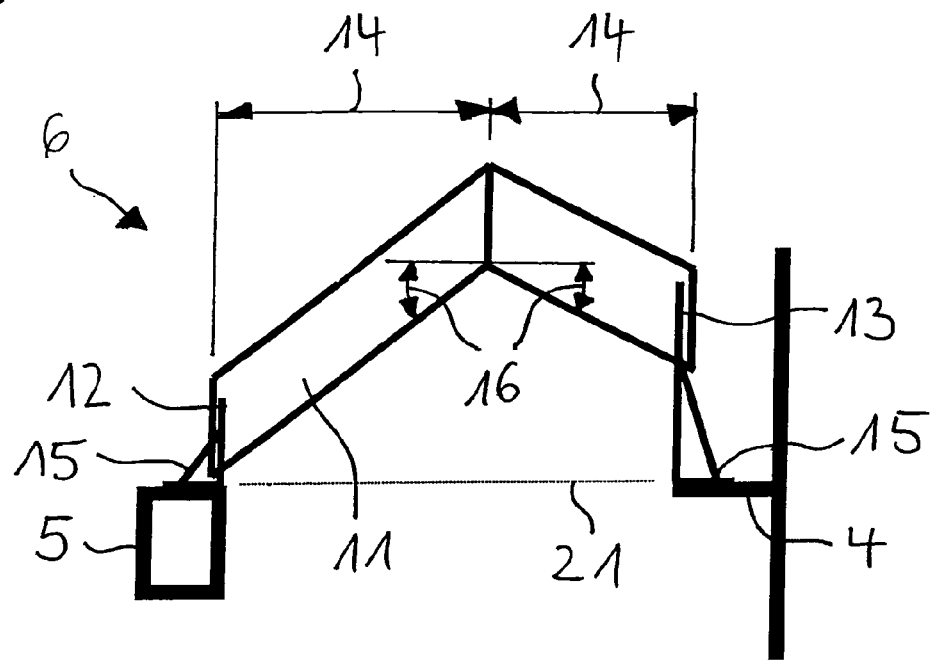
FIG. 5 shows a design variant of a drop separator in which the end plates are of unequal level.

FIG. 5 shows a further design variant of a drop separator 6 according to the invention which is designed with a plurality of drop separator lamellae 11 which are arranged at an inclination to one another and are fixed by means of two end plates 12, 13. To ensure the same inclination 16, height compensation means are provided in a form where the sliding feet 15 present in each case are designed with a different height in relation to a level 21. This affords an arrangement of unequal level of the two end plates 12, 13 with respect to one another. The first sliding foot 15 near the first end plate 12 is designed to lie on the carrying beam 5. The second sliding foot 15 near the second end plate 13 is positioned movably in the same way on the edge rest 4 of the gas scrubber. In the exemplary embodiment illustrated, the end plates 12, 13 are designed parallel to one another, but of unequal level, the drop separator lamellae 11 of a set being designed with different lengths 14.

Figure 6:
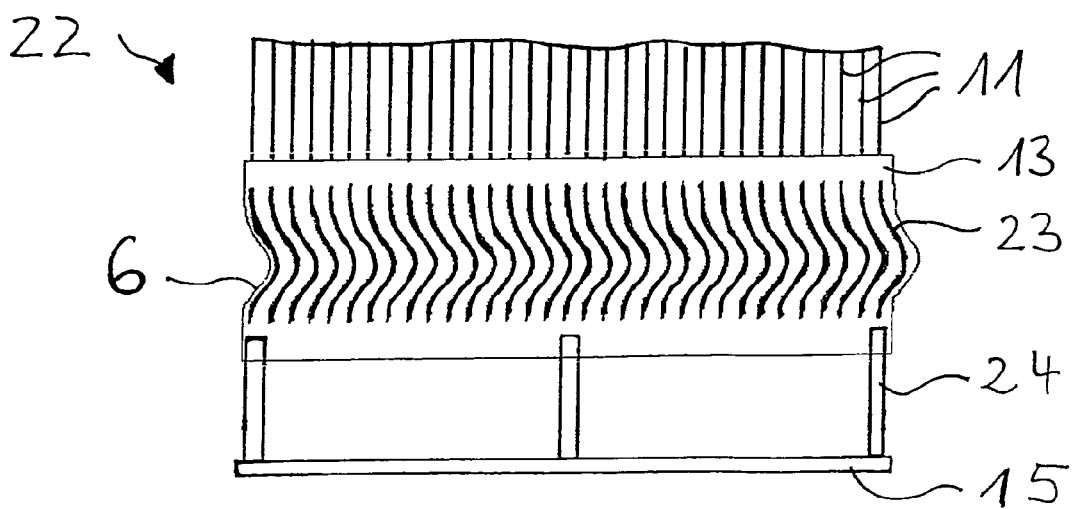
FIG. 6 shows a side view of an end plate of a design variant of a drop separator.

FIG. 6 illustrates once again the possible fixing of such a set of drop separator lamellae 11 to an end plate 13 in order, for example, to implement a module 22. For this purpose, the plurality of drop separator lamellae 11 are inserted through into corresponding clearances of the end plate 13 and then fixed permanently by means of a weld seam 23. The weld seam 23 is designed here to be liquid-tight. To mount the second end plate 13, a sliding foot 15 is provided, which is fastened to the end plate 13 by means of legs 24 which may serve, for example, as height compensation means.

By virtue of the present invention, a gas scrubber can be operated in a particularly productive and effective way.

LIST OF REFERENCE SYMBOLS

1 Gas scrubber
2 Drop separator level
3 Cross section
4 Edge rest
5 Carrying beam
6 Drop separator
7 Flow cross section
8 Circumference
9 Supporting structure
10 Flow shadow
11 Drop separator lamellae
12 First end plate
13 Second end plate
14 Length
15 Sliding foot
16 Inclination
17 Flow direction
18 Spraying system
19 Wall
20 Face
21 Level
22 Module
23 Weld seam
24 Leg
25 Moisture
26 Flow direction

What is claimed is:

1. A gas scrubber, with at least one drop separator level which spans a cross section of the gas scrubber, the gas scrubber comprising at least one edge rest and a plurality of carrying beams, spanning the cross section, for the mounting of drop separators which jointly delimit a free flow cross section of the gas scrubber, and further comprising at least one drop separator for removing drops from a gas flow with a first set of a plurality of drop separator lamellae and a second set of a plurality of drop separator lamellae in the at least one drop separator level which are arranged at an inclination to one another and wherein one end of the drop separator lamellae of the first set is connected to one end of the drop separator lamellae of the second set and wherein the other ends of the drop separator lamellae of both sets are each fixed by means of at least one end plate, characterized in that the end plates are at least of unequal level or non-parallel with respect to one another,
wherein the at least one drop separator level is one of a plurality of parallel planar drop separator levels spaced apart in a gas flow direction of the gas scrubber, the gas scrubber including a respective two-dimensional grid of drop separators at each drop separator level supported by a respective edge rest and a respective plurality of carrying beams,
and wherein the drop separators of each drop separator level include central-region drop separators and peripheral drop separators, the peripheral drop separators being adjacent to an exterior wall of the gas scrubber, each central-region drop separator having first and second sets of drop separator lamellae of equal length and inclination to define a fully symmetric V-shaped cross section, each of at least some of the peripheral drop separators having a second set of drop separator lamellae of equal inclination to but shorter length than a respective first set of drop separator lamellae to define a non-symmetric partial-V-shaped cross section, an outer end of the second set of drop separator lamellae of the peripheral drop separators resting on the edge rest of the respective drop separator level.

2. The gas scrubber according to claim 1, this having a cross section with an at least partially bent circumference, characterized in that drop separators adapted to the at least partially bent circumference are provided.

3. The gas scrubber according to claim 1, characterized in that the drop separators are held by means of a supporting structure which is arranged essentially in the flow shadow of the edge rest and of the plurality of carrying beams.

4. The gas scrubber according to claim 1, a supporting structure being provided for mounting the drop separators, characterized in that the supporting structure lies at least on the edge rest or the plurality of carrying beams.

5. A drop separator for removing drops from a gas flow for a gas scrubber, with a first set of drop separator lamellae and a second set of drop separator lamellae which are arranged at an inclination to one another and wherein one end of the drop separator lamellaes of the first set is connected to one end of the drop separator lamellaes of the second set and wherein the other ends of the drop separator lamellaes of both sets are each fixed by means of at least one end plate, characterized in that the end plates are at least of unequal level or non-parallel with respect to one another,
wherein the first and second sets of drop separator lamellae are inclined at equal opposing angles with respect to a flow direction of gas flow through the drop separator in use, and wherein the end plates are at least of unequal level or non-parallel with respect to one another in the flow direction,
and wherein the drop separator has a trapezoidal shape in a plane perpendicular to the flow direction, and wherein the second set of drop separator lamellae are of successively shorter lengths such that their other ends define one non-parallel side of the trapezoidal shape.

6. The drop separator according to claim 5, characterized in that the plurality of drop separator lamellae are designed at least partially with a different length.

7. The drop separator according to claim 5, characterized in that the drop separator is designed with at least one outwardly directed sliding foot.

8. The drop separator according to claim 5, characterized in that the plurality of drop separator lamellae are welded to the end plates.

9. The drop separator according to claim 5, characterized in that a height compensation means for implementing a specific inclination of the drop separator lamellae is provided.

10. The gas scrubber according to claim 1 characterized in that at least 95% of the free flow cross section is designed with throughflow drop separators.

11. The drop separator according to claim 1, wherein the second set of drop separator lamellae are shorter than the first set of drop separator lamellae along their respective inclinations.

12. The drop separator according to claim 5, wherein the end plate of the first set of drop separator lamellae is perpendicular to the flow direction, and the end plate of the second set of drop separator lamellae is tilted non-perpendicular to the flow direction to accommodate successively higher other ends of the second set of drop separator lamellae.

13. The gas scrubber according to claim 1, wherein each of the at least some peripheral drop separators has a trapezoidal shape in a plane perpendicular to the flow direction, and wherein the second set of drop separator lamellae are of successively shorter lengths such that their outer ends define one non-parallel side of the trapezoidal shape.

* * * * *